June 28, 1966     A. L. KORR     3,257,934

PACKAGED COMESTIBLE COOKING AND HEATING OVEN

Filed Jan. 23, 1964

INVENTOR.
ABRAHAM L. KORR
BY
Arthur H Seidel
ATTORNEY

United States Patent Office 3,257,934
Patented June 28, 1966

3,257,934
PACKAGED COMESTIBLE COOKING AND HEATING OVEN
Abraham L. Korr, 8712 Hickory Drive, Philadelphia, Pa.
Filed Jan. 23, 1964, Ser. No. 339,792
4 Claims. (Cl. 99—358)

This invention primarily relates to a new and improved oven for rapidly heating or cooking foods in packages by electrical resistance methods.

This invention is primarily concerned with cooking and heating packaged comestibles which are in a frozen refrigerated, or ambient state. Prior art devices for cooking by electrical resistance methods have often proved cumbersome and unwieldy to manage. Also, earlier attempts at resistance cooking and heating were unsatisfactory because they impaled the food to be cooked on the electrodes so as to maintain them in electrical contact. This resulted in scorching of the food due to unsatisfactory contact, non-uniformity of temperature distribution, and too long a period for the heating and/or cooking cycle.

It is the general object of this invention to avoid and overcome the foregoing and other difficulties of the prior art practices by the provision of a new and improved cooking and heating oven for packaged comestibles.

A more specific object of this invention is to provide a relatively simple oven which is easy to manipulate and operate for resistance heating and cooking of packaged comestibles and which also maintains good electrical contact throughout the cooking and heating operation.

A further object of this invention specifically resides in the provision of an elongated pair of electrodes between which a packaged comestible having a electrically conducting side walls may be positioned. By providing electrodes which have a length substantially equal to the side walls of the packaged comestibles, it is possible to obtain an even distribution of heat across the food within the package whereby uniform cooking of the contents of the package is effected.

Yet another object of this invention is to provide an oven which has an opening at one end thereof for receiving a packaged comestible in sliding engagement with a pair of spaced electrodes which have their major dimension extending substantially perpendicular to the opening. This results in quick and efficient manipulating of the comestible between the electrodes in the oven for rapid heating and cooking.

Another object of this invention resides in the provision of a separate heat producing means in the oven between the electrodes and spaced from the bottom of the packaged comestible when it is placed in contact with the electrodes. Thus, the bottom of the packaged comestible may be heated to thaw any ice in the bottom of the comestible package which would act as an insulator to the passage of electric current between the electrodes whereby uniform cooking of the comestible is again insured.

A still further object of this invention comprises the provision of a counterweighted cover element pivoted to the electrode support members which is adapted to assume a position insuring electrical contact between the comestible package and the electrodes.

Other objects will appear hereinafter.

For the purpose of illustrating the invention, there is shown in the drawings a form which is presently preferred; it being understood, however, that this invention is not limited to the precise arrangements and instrumentalities shown.

Figure 1:
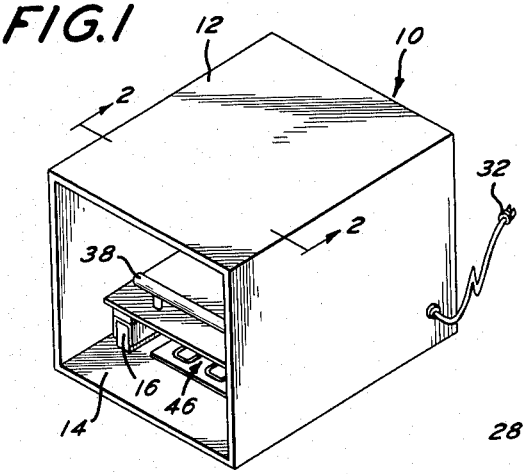
FIGURE 1 is a perspective view of the oven comprising the subject matter of the instant invention.

Referring to the drawing in detail, the instant invention is illustrated as comprising an oven generally designated by the numeral 10. The oven 10 comprises a generally rectangular parallelopiped housing 12 including an enlarged opening 14 for access to the interior of the housing 12.

A pair of spaced parallel electrode supports 16 and 18 are positioned within the housing 12 with their major dimension extending substantially perpendicular to the opening 14 in the housing. The electrode supports 16 and 18 are substantially rectangular in cross section and comprise a pair of side walls defining a well 20 for the reception of a packaged comestible such as generally indicated at 22.

A pair of electrodes 24 and 26 which are channel-shaped in cross section are placed on the electrode supports 16 and 18 in encompassing relation thereto. The electrodes 24 and 26 extend substantially the entire length of the electrode supports. The electrodes are formed from any good conducting material.

An electric potential is established between the electrodes by a pair of wires 28 and 30 leading to a plug 32 which may be connected to a suitable source of electrical energy. Therefore, when power is transmitted to the electrodes, which may be accomplished by merely plugging the plug 32 into a suitable electrical socket, an electrical potential is established between the electrodes.

Figure 2:
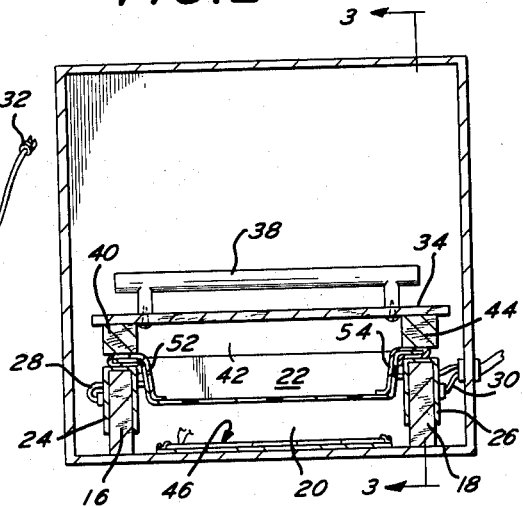
FIGURE 2 is a cross sectional view taken substantially along the plane indicated by the lines 2—2 of FIGURE 1 and illustrating the interior components of the oven and their specific relationship.
Figure 3:
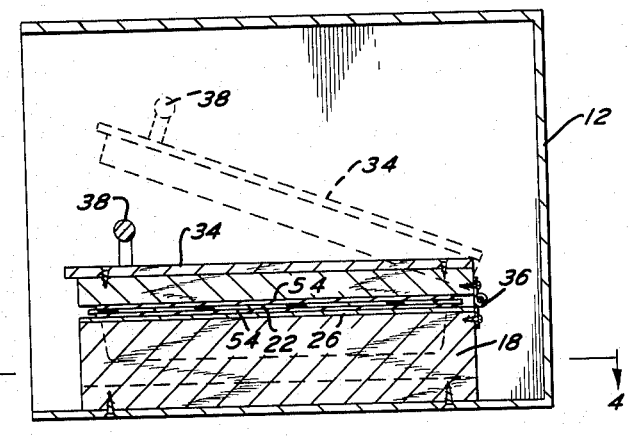
FIGURE 3 is a cross sectional view taken substantially along the plane indicated by the lines 3—3 of FIGURE 2 and also illustrating in phantom lines the movement of the cover element for maintaining electrical contact between the comestible package and the electrodes.
Figure 4:
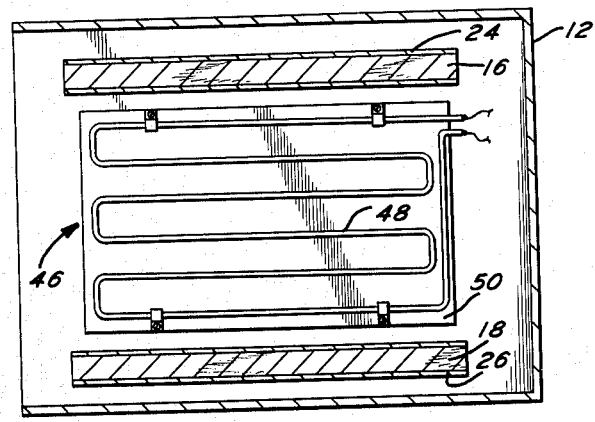
FIGURE 4 is a cross sectional view taken substantially along the plane indicated by the lines 4—4 of FIGURE 3 and showing a separate heat producing means positioned between the electrodes for thawing the bottom of the comestible package.

A cover element 34 is pivotably connected by a suitable hinge such as 36 to the electrode supports 16 and 18. The cover element 34 is provided with a counterweight 38 at a location remote from the hinge 36. The counterweight 38 normally biases the cover to a closed position as shown in FIGURES 2 and 3. The counterweight 38 also serves as a handle for raising and lowering the cover.

Depending from the cover 34 are three pressure contact members 40, 42 and 44. The pressure contact members 40 and 44 extend substantially parallel to the electrodes 24 and 26 and aid in maintaining good electrical contact between the comestible package 22 and the electrodes as will be explained hereinafter. It should also be noted that by the use of depending and spaced pressure applying members, a hollow cavity is thus formed in the cover element 34. This provides a relief for steam pressure generated within the packaged comestible and substantially precludes the steam pressure from building up within the comestible and possibly raising the cover.

Disposed within the well 20 is a separate heat producing means generally indicated by the numeral 46. The heat producing means disclosed in this application comprises a plurality of heating coils such as 48 secured to a support 50 connected to the bottom wall of the housing 12. While heating coils are specifically disclosed, other equivalent heating means are contemplated by the instant invention. The heat producing means 46 is positioned between the electrodes adjacent the bottom wall of the comestible package 22. If the comestible within the package is frozen, a thin layer of ice is usually formed on the bottom of the package. This will act as an insulator for the passage of electric current through the food. Therefore, it is desirable to preclude this and thus the heat producing means 46 are provided to thaw the bottom of the package.

The comestible package is of the type disclosed in my co-pending application Serial No. 261,435 entitled "Food Container Adapted for Use in Electrically Cooking and Heating Foods" filed February 27, 1963 and Serial No. 339,622 entitled "Food Container" filed January 23, 1964. Therefore, a detailed explanation of the package is not thought necessary. This package 22 is formed with a thin layer of electrically conducting material such as 52 and 54 on the inside and outside surfaces of the side walls of the package. The electrically conducting material extends along the inside surface of the side wall of the package into electrical contact with the food within the package.

The operation of the device is substantially as follows:

The plug 32 is first connected to a conventional source of electrical energy. The cover element 34 is then raised to the position shown in phantom lines in FIGURE 3. A packaged comestible such as 22 is then placed in the oven between the electrodes 24 and 26 by sliding the flanges of the package along the electrodes. The cover element 34 is then released and the counterweight 38 biases the cover element into seated engagement with the packaged comestible.

The current will flow from one electrode to the other through one of the conducting films 52, 54 into the interior of the packaged comestible 22, through the food within the package, out the other of the films 52, 54 and through the other electrode. The food within the package will thus be heated. If the food is initially in a frozen state, the heat producing means 46 are activated to thaw the bottom of the package 22. This will thaw any ice on the bottom of the package to provide a conducting rather than an insulating film within the package.

Due to the engagement of the electrodes with the entire length of the conducting film on the package, uniform cooking of all food particles within the package is effected. The counterweighted cover element insures proper electrical contact between the package and the electrodes at all times along the entire surface of the package.

The present invention may be embodied in other specific forms without departing from the spirit or essential attributes thereof and, accordingly, reference should be made to the appended claims, rather than to the foregoing specification as indicating the scope of the invention.

I claim:

1. Apparatus for cooking and heating a food package having electrically conducting side walls comprising a well for receiving a food package defined by a pair of spaced side walls, a pair of electrodes, each electrode being positioned on a well side wall for substantially the entire length thereof, and pressure applying means connected to said spaced well side walls for maintaining electrical contact between a package positioned within said well and said electrodes, said pressure applying means including a cover, a pivotable connection between said cover and said spaced well side walls, and a counterweight on said cover remote from said pivotable connection, said cover including spaced force transmitting members extending substantially parallel to said well side walls for substantially the entire length thereof.

2. Apparatus for cooking and heating a food package having electrically conducting side walls comprising a well for receiving a food package defined by a pair of spaced side walls, a pair of electrodes, each electrode being positioned on a well side wall, and pressure applying means supported adjacent said spaced well side walls, said pressure applying means comprising a cover, said cover including spaced electrically non-conductive force transmitting portions extending substantially parallel to said well side walls, corresponding surfaces of each electrode being parallel and co-planar and disposed in an upwardly facing direction, said electrically non-conductive force transmitting portions overlying and juxtaposed to said last mentioned surfaces of said electrodes for maintaining electrical contact between a package positioned within said well and said electrodes.

3. Apparatus for cooking and heating a food package having electrically conducting side walls comprising a well for receiving a food package defined by a pair of spaced side walls, a pair of electrodes, each electrode being positioned on a well side wall for substantially the entire length thereof, and pressure applying means connected to said spaced well side walls for maintaining electrical contact between a package positioned within said well and said electrodes, said electrodes being channel-shaped in cross-section and said well side walls being rectangular in cross-section, said well side walls being received within said channel-shaped electrodes.

4. Apparatus for cooking and heating a food package having electrically conducting side walls comprising a well for receiving a food package defined by a pair of spaced side walls, a pair of electrodes, each electrode being positioned on a well side wall for substantially the entire length thereof, and pressure applying means connected to said spaced well side walls for maintaining electrical contact between a package positioned within said well and said electrodes, said pressure applying means including a cover pivotably connected to said well side walls and a counterweight on said cover remote from said pivotable connection.

References Cited by the Examiner

UNITED STATES PATENTS

| | | | |
|---|---|---|---|
| 2,052,919 | 9/1936 | Brogdon | 99—358 X |
| 2,200,406 | 5/1940 | Watson | 99—358 |
| 2,310,723 | 2/1943 | Whitchruch | 99—358 X |
| 2,474,390 | 6/1949 | Aff | 99—358 X |
| 2,738,723 | 3/1956 | Jennett | 99—339 X |
| 2,844,695 | 7/1958 | McLean | 99—107 X |
| 2,896,527 | 7/1959 | Richman et al. | 99—358 X |
| 2,924,167 | 2/1960 | Rhodes | 99—358 |
| 2,951,434 | 9/1960 | Williams | 99—358 X |
| 3,062,663 | 11/1962 | Furgal et al. | 99—358 X |
| 3,099,202 | 7/1963 | Palmer | 99—358 X |
| 3,190,051 | 6/1965 | Souligney | 100—93 |
| 3,210,199 | 10/1965 | Schlaf | 99—171 |

WALTER A. SCHEEL, *Primary Examiner.*

BILLY J. WILHITE, IRVING BUNEVICH, *Examiners.*